(No Model.)
W. LANG.
SPEED MEASURE FOR SHAFTING.
No. 527,207. Patented Oct. 9, 1894.
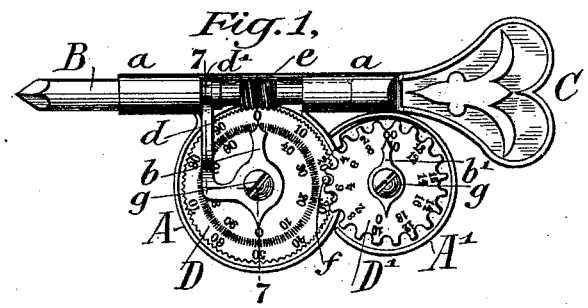
Fig. 1.
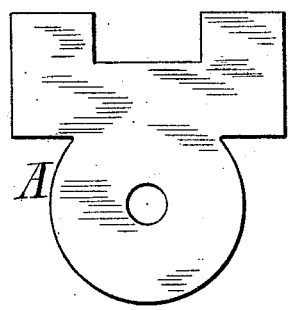  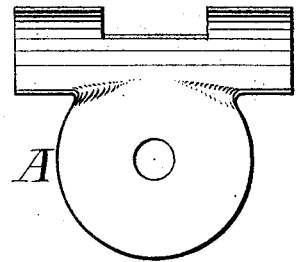
Fig. 2.   Fig. 2ª.   Fig. 3ª.   Fig. 3.
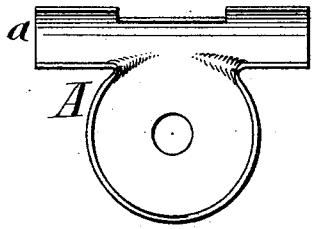  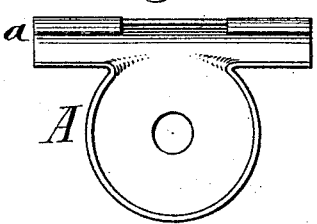
Fig. 4.   Fig. 4ª.   Fig. 5ª.   Fig. 5.
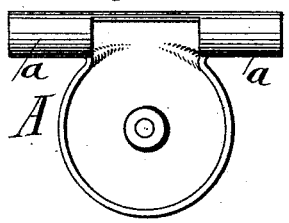  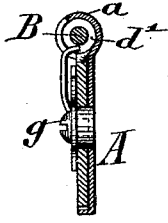 
Fig. 6.   Fig. 6ª.   Fig. 7.   Fig. 8.
WITNESSES:
K. R. Brennan
Otto Reiss
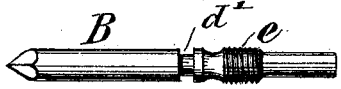
Fig. 9.
INVENTOR
William Lang
BY
ATTORNEYS.
THE NORRIS PETERS CO., PHOTO-LITHO., WASHINGTON, D. C.

UNITED STATES PATENT OFFICE.

WILLIAM LANG, OF BROOKLYN, NEW YORK, ASSIGNOR TO GEORGE W. CHURCH, OF NEWARK, NEW JERSEY.

SPEED-MEASURE FOR SHAFTING.

SPECIFICATION forming part of Letters Patent No. 527,207, dated October 9, 1894.

Application filed March 14, 1894. Serial No. 503,597. (No model.)

*To all whom it may concern:*

Be it known that I, WILLIAM LANG, a citizen of the United States, residing at Brooklyn, in the county of Kings and State of New York, have invented certain new and useful Improvements in Speed-Indicators, of which the following is a specification.

This invention has general reference to an improved speed-indicator of that class which can be used with equal advantage for measuring the speed of shafts rotating toward the right or left.

It relates more specifically to certain improvements in the speed indicator for which Letters Patent were granted to me, No. 268,107, dated November 28, 1882, said improvements being designed with a view of permitting the indicator to register without detaching the handle, while the device is still adapted for reading off the rotations of the shaft whatever be the direction in which it turns.

The invention consists of a speed-indicator, the spindle of which is supported in sleeve-shaped bearings which are made integral with the casing within which the main indicating gear-wheel is located, said casing and bearings being made of one piece of sheet-metal bent into suitable shape.

The invention consists, secondly, of an indicator, hand or pointer, which is provided with an arm that engages a groove in the spindle, by which the registering device is operated, so as to retain said spindle in position in the bearings of the casing; and the invention consists further of certain details of construction, which will be fully described hereinafter and finally pointed out in the claim.

In the accompanying drawings, Figure 1 represents a top view of my improved speed-indicator. Figs. 2, 2ª, 3, 3ª, 4, 4ª, 5, 5ª, 6, and 6ª are front views, sections, and vertical central sections, showing the blank from which the casing of my speed-indicator is made in the different stages of bending the same by means of suitable dies until the final form of the casing is produced. Fig. 7 is a transverse section on line 7—7, Fig. 6. Fig. 8 is a detail view of the index-hand and integral spring arm, by which the spindle of the speed-indicator is retained in position in the bearings of the casing, and Fig. 9 is a detail view of the spindle.

Similar letters of reference indicate corresponding parts.

Referring to the drawings, A represents the casing of my improved speed-indicator. The casing A is provided with sleeve-shaped bearings $a$ for the spindle B, which is supported in said bearings, it being extended through the left-hand bearing $a$ and provided with a sharp point that is placed in a complementary socket in the end of the shaft or other rotating body when it is desired to ascertain the rotations of the same, whether it turns in one or the opposite direction. Into the other or right-hand bearing $a$ is inserted a stationary handle C, which is soldered, riveted or otherwise permanently attached thereto. The spindle B is retained in the bearings $a, a$, by means of a rectangular spring-arm $d$ made integral with the pointer $b$ of the main indicating gear-wheel D, the end of the arm extending into an annular groove $d'$ of the spindle, as shown clearly in Fig. 1.

The spindle B is provided intermediately between the bearings $a, a$, with a worm $e$ that engages the teeth of the intermeshing gear-wheel D which is provided at one point of its circumference with a projecting pin $f$ for engaging a second gear-wheel D' supported sidewise of the gear-wheel D in a supplementary casing A' in such a manner that its teeth overlap a portion of the circumference of the first gear-wheel D, as shown clearly in Fig. 1. A supplementary casing A' is attached to the under side of the main casing A by screws, rivets or otherwise, so that it is supported firmly in position on the same. The gear-wheels D, D', turn on fixed center-pivots, $g, g$, attached to the casings A, A', each being provided with an index-hand $b, b'$, these hands being screwed in position on the center pivots $g, g'$. The face of the gear-wheels D, D' is graduated, the graduations being numbered in opposite directions, so that the number of rotations of the wheels can be read off by the relative position of the index-hands on the same, whether the spindle is turned in one or the opposite direction by the shaft, the rotations of which are to be counted.

The casing A and its bearings $a, a$, are made of one integral piece of sheet-metal, which is subjected successively to the action of a number of suitable dies, so that the circumferential rim or flange F is formed along the circumference of the casing, while the bearings $a, a$, are gradually formed into cylindrical shape, as shown in Fig. 6. The successive actions of the dies are illustrated by Figs. 2 to 6 and 6ª. The casings A, A', are flanged as far as they extend around the gear-wheels D, D', so as to protect the same and prevent thereby the interference of exterior obstructions when the speed-indicator is carried in the pocket.

The speed-indicator is applied in the usual manner to the shaft or other rotating body after both gear-wheels D, D' have been set with their zero marks to the index hands, which is preferably accomplished by turning the gear-wheel D by the spindle and the gear-wheel D' by the fingers. The rotations of the shaft or other rotating body within a given time are then read off by the relative positions of the gear-wheels relatively to the fixed index-hands. By my improved speed-indicator, the rotations of the shaft can be counted whether the same turns toward the right or left, owing to the arrangement of the figures in the graduation in the opposite directions to each other, by which the use of the indicator is greatly facilitated and the permanent connection of the handle with the casing permitted. In the speed-indicator heretofore patented by me the spindle was provided with two pointed ends, the handle being either attached to one or the opposite end of the spindle according as the shaft is turned in one or the opposite direction. This is dispensed with as by the present arrangement of the gear-wheels the rotation of the shaft can be read off, whatever be the direction of motion of the same.

Having thus described my invention, I claim as new and desire to secure by Letters Patent—

In a speed-indicator, the combination of a supporting casing provided with bearings on its circumference, a spindle journaled in said bearings, said spindle being provided with a transmitting worm and an annular groove, registering gear-wheels operated by the worm, and index-hands fixed relatively to the bearings of the spindle, and attached to the journals of the wheels, one of said hands being provided with a spring arm normally projecting into said annular groove, so as to retain the spindle in position in the bearings, substantially as set forth.

In testimony that I claim the foregoing as my invention I have signed my name in presence of two subscribing witnesses.

WILLIAM LANG.

Witnesses:
GEO. L. WHEELOCK,
K. R. BRENNAN.